United States Patent Office 3,189,625
Patented June 15, 1965

3,189,625
NOVEL 17-KETALS OF EQUILENIN AND METHOD FOR PREPARING
Peter B. Russell, Villanova, and Kurt W. Ledig, Philadelphia, Pa., assignors to American Home Products Corporation, New York, N.Y., a corporation of Delaware
No Drawing. Filed Sept. 4, 1962, Ser. No. 221,324
1 Claim. (Cl. 260—397.5)

This invention relates in general to a novel series of equilenin 17-ketals and ethers and esters thereof, methods of preparing, and pharmaceutical compositions containing the same.

Particularly, the invention relates to those 3-substituted equilenin 17-ketals having the general structure:

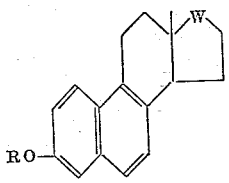

wherein R represents a substituent selected from the group consisting of hydrogen, lower alkyl, lower alkenyl, lower cycloalkyl, acyl and lower aralkyl, and W represents a member selected from the group consisting of alkylenedioxymethylene, dialkoxymethylene, alkylenethioxymethylene, and alkylenedithiomethylene.

In the definition of these novel compounds the term lower alkyl as employed is intended to refer to those alkyl groups having from about 1 to 20 carbon atoms therein and, more particularly, to those having less than about 10 carbon atoms. The alkyl group may be normal or branched in structure although the normal chain is generally preferred. Some examples of suitable alkyl groups would be such groups as methyl, ethyl, propyl, butyl, isopropyl, pentyl, dodecyl, and the like. The term lower cycloalkyl, on the other hand, relates to a substituent wherein the carbon atoms are joined in a carbocyclic ring which is generally a 5 or 6 membered structure, but which may contain a smaller or larger number of carbon atoms subject to the practical limit of stability of such structures. Cyclohexyl would therefore be an instance of a preferred member of this type of substituent. The term lower aralkyl refers to a lower alkyl group substituted in an aromatic ring structure which may contain from 1 to about 12 carbon atoms. An example of this type of substitution would be benzyl, phenylethyl, phenylisopropyl, and the like. By the term acyl as employed herein is intended the mono-, di-, or polycarboxy acid radical derived from a saturated or unsaturated organic acid by removal of the hydroxyl group. Such radicals therefore as the alkanoyl radicals of corresponding acids like acetic, propionic and benzoic acids and the like would be included. The term lower alkenyl relates to lower unsaturated hydrocarbon radicals having at least one double bond therein such as allyl, vinyl and the like.

The substituent present in the 3-position as RO may thus include those lower alkoxy substituents as methoxy, ethoxy, propoxy, dodecyloxy and other similar ether radicals derived from normal or branched chain structures. In any event the invention embraces all those hydrocarbons noted, and others which are linked by an oxygen atom to the 3-position of the steroid nucleus.

An essential facet of these novel structures which it is believed enhances their antilipemic activity while minimizing feminizing effects is the substitution indicated by W in the 17-position of the steroid molecule. It is intended by reference to the 17-ketal to embrace various ketal substituents. These may optimally have 2 carbon atoms therein, but may have as many as 10 carbon atoms where the term alkylenedioxymethylene is employed to define the ketal member. On the other hand, by the term alkylenethioxymethylene it is intended to include those ketals in which one oxygen atom of the structure has been replaced by a sulfur atom. In a corresponding manner the term alkylenedithiomethylene, as it is employed herein, refers to those ketals wherein both oxygen atoms have been replaced by a sulfur atom. In those cases where a 17-substituted hemithioketal is desired, a reagent such as a thioalcohol like 2-mercaptoethanol is substituted for the alkylene glycol in the ketalizing step of the synthesis. In those cases where the 17-dithioketal is desired, a reagent such as ethanedithiol may be substituted for the alkylene glycol in the ketal formation.

The compounds of the invention may be prepared by reacting a suitably substituted equilenin with a ketalizing agent in a manner typified by the following reaction:

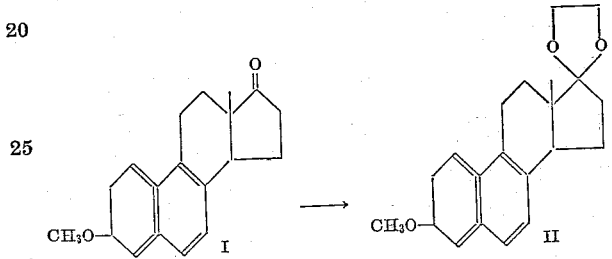

In the above reaction a compound such as equilenin methyl ether (I) may be ketalized by reaction with one of a number of ketalizing agents such as ethylene glycol and p-toluenesulfonic acid, although a number of other glycols or acids will work equally well, to form the corresponding 3-methoxyequilenin 17-ketal. It should be understood that within the general framework of the invention other alternate means of ketal formation may be employed if desired. For instance, the process of 17-ketalization to form these novel compounds may be carried out by an exchange reaction which is known as exchange ketalization. In this method the 17-ketone to be ketalized is contacted with the ketal of another carbonyl compound such as the ethylene ketal of acetone, methylethylketone, mesityl oxide or the like in the presence of an acidic catalyst to effect a transfer of the ketal function from the latter compound to the former one. This reaction may be conducted either in the presence or absence of heating as specific conditions dictate. As a general rule the reaction temperature is limited by the reflux temperature of the solvent employed, and the reaction may continue for from about 2 to 24 hours' duration.

It should further be noted that the present invention also comprehends the preparation of so-called "open chain" 17-ketals wherein the carbon atoms attached to the oxygen or sulfur atoms are not in fact joined together. However, the preparation of compounds such as these will become clear to those skilled in the art after consideration of the foregoing disclosure. One suitable method of preparing these compounds would involve etherifying an equilenin alkyl ether with a reagent such as ethyl orthoformate and a suitable acid such as sulfuric acid at a temperature of from about 40° to 70° C. for from about 4 to 8 hours, followed by addition of a base such as an alkali metal carbonate.

The compounds of the invention are useful in the field of experimental pharmacology as well as being valuable as intermediates for further steroid synthesis in preparing new steroidal compounds. In addition, many of the compounds of the invention have been found to demonstrate high antilipemic properties coupled with low feminizing action. Also, besides having capacity to regulate blood lipids, the compounds are useful for their general hormonal effect, particularly in the female. Therefore many of the compounds would be expected to exhibit utility in those areas where estrogens are employed, such as female hypogonadism, amenorrhea, dysmenorrhea, metrorrhagia, ovulation block and contraception, pregnancy maintenance, arteriosclerosis, osteoporosis, menopausal symptoms, infertility, regulation of water balance, functional uterine bleeding, and the like.

The novel compounds of the invention when contemplated for use in pharmaceutical products may be admixed and administered in combination if desired with a large number of compatible diluents, carriers and the like to form a pharmaceutical composition. Such well-known liquid carriers as mineral or vegetable oil or a lower aliphatic alcohol may be used where injectables are to be prepared. Glycerine or a similar substance may be used where the compound is to be administered as a syrup. Solid excipients, binders, extenders or carriers such as carboxymethylcellulose, starches, sugars and the like may be added where tablets or powders are to be employed as a means of administration. The dosage of the compounds will vary with the severity of the ailment and in general can vary from about 0.5 to 100 mg./kilo of body weight per day depending upon the many factors of the case involved.

While the above general description and following specific examples will serve to illustrate the invention particularly, it is to be understood that their purpose is merely illustrative. For a proper legal definition of the scope of the invention, attention may only be directed to the appended claim.

EXAMPLE 1

3-methoxy-17,17-ethylenedioxyestra-1,3,5(10),
6,8-pentaene

Reflux a mixture of 160 mg. of p-toluenesulfonic acid monohydrate, 40 ml. of benzene, 500 mg. of equilenin methyl ether and 5.0 ml. of ethylene glycol for 19 hours by using a Dean-Stark water separator while stirring. Wash the reaction mixture with saturated sodium bicarbonate solution, brine, and dry over magnesium sulfate. After removing the solvent crystallize the residue from a mixture of ethyl acetate-ethyl alcohol. Treat the product, 340 mg., with 37 mg. of hydroxylamine hydrochloride in 5.0 ml. of pyridine on the steambath for 1 hour. Evaporate the reaction mixture under reduced pressure and dissolve the residue in 8 ml. of benzene. Filter the benzene solution through an alumina (grade I neutral) column and elute the product with 50 ml. of benzene. Evaporation of the benzene gives 250 mg. of a white crystalline compound, M.P. 141–145° C. Infrared spectrum ($CS_2$), no carbonyl absorption at $5.75\mu$.

EXAMPLE 2

3-propoxy-17,17-ethylenedioxyestra-1,3,5(10),
6,8-pentaene

Treat equilenin propyl ether with ethylene glycol and p-toluenesulfonic acid in benzene as described in Example 1. Recrystallize the product from ethyl acetate-ethyl alcohol. The product shows in the infrared spectrum ($CS_2$) no carbonyl absorption at $5.75\mu$.

EXAMPLE 3

3-butoxy-17,17-ethylenedioxyestra-1,3,5(10),6,8-pentaene

React equilenin butyl ether as described in the example above. Recrystallize the product from ethyl acetate-ethyl alcohol. The product shows no carbonyl absorption in infrared spectrum ($CS_2$) at $5.75\mu$.

EXAMPLE 4

Equilenin propyl ether

Treat a solution of equilenin in ethyl alcohol with an excess of potassium carbonate and propyl iodide under reflux for 4 hours. Evaporate the reaction mixture to one-half of its volume and take down the filtered solution to dryness. Recrystallize the residue from ethyl alcohol.

EXAMPLE 5

Equilenin butyl ether

When equilenin is treated with butyl iodide under the conditions described above, the butyl ether is obtained.

EXAMPLE 6

3-allyloxy-17,17-ethylenedioxyestra-1,3,5(10),
6,8-pentaene

Dissolve one gram of equilenin 17-ethylene ketal in 50 ml. of ethanol, and add 5 ml. of allyl bromide, together with 280 mg. of sodium hydroxide. Reflux the mixture for 20 hours, and remove the solvent under vacuum. Dissolve the residue so obtained in carbon tetrachloride, and wash the solution with 5% sodium hydroxide solution, and then with water. Reduce the thoroughly dried carbon tetrachloride solution in volume under vacuum until solids precipitate. Recrystallize the solids thus obtained from alcohol, thus affording the product.

EXAMPLE 7

17,17-ethylenedioxy-3-methoxyestra-1,3,5(10),
6,8-pentaene

Cool a solution of 1.0 g. of equilenin 17-ethylene ketal and 12.0 g. of potassium hydroxide in 35 ml. of water and 100 ml. of methyl alcohol to 22°. To this cooled solution, add 11.0 ml. of dimethyl sulfate with agitation over a period of 35 minutes, while maintaining the temperature between 22 and 28°. Allow the reaction mixture to agitate at 25° for an additional 1.25 hours. Dilute the mixture to 500 ml. with water and cool to 10°. Collect the product by filtration, wash with water and dry. Recrystallize the product from methanol.

EXAMPLE 8

3-ethoxy-17,17-ethylenedioxyestra-1,3,5(10),6,8-pentaene

Reflux two grams of equilenin 17-ethylene ketal with 50 ml. of ethanol containing 10 ml. of ethyl bromide and 700 mg. of sodium hydroxide. Continue reflux for 20 hours, evaporate the organic solvent solution, and dissolve the solid residue in carbon tetrachloride. Wash organic solvent solution of product with 5% sodium hydroxide solution and then with water, and finally dry over anhydrous magnesium sulfate. Evaporate the dried solution under vacuum, and recrystallize the material from methanol to obtain the product.

EXAMPLE 9

3-cyclopentyloxy-17,17-ethylenedioxyestra-1,3,5(10),
6,8-pentaene

Reflux overnight a mixture of 1.0 g. of equilenin 17-ethylene ketal, 30 ml. of ethanol, 10 ml. of cyclopentyl bromide and 750 mg. of sodium hydroxide, and then remove the solvents under vacuum. Dissolve the dried residue in carbon tetrachloride and wash the solvent solution with 5% sodium hydroxide solution, and then with water. Dry the washed solution over anhydrous magnesium sulfate and evaporate under vacuum. Recrystallize the solids thus obtained from methanol to yield the product.

EXAMPLE 10

3-benzyloxy-17,17-ethylenedioxyestra- 1,3,5(10),6,8-
pentaene

Reflux for twenty-four hours a solution containing 1.0 g. of equilenin 17-ethylene ketal, 5 ml. of benzyl bromide, and 350 mg. of sodium hydroxide in 50 ml. of ethanol. Remove the organic solvent under vacuum, and dissolve the dried residue in carbon tetrachloride and wash the solution with 5% sodium hydroxide solution and then with water. Remove the solvent under vacuum, and recrystallize the solids thereupon obtained from methanol to afford the product.

EXAMPLE 11

*3-acetoxy-17,17-ethylenedioxyestra-1,3,5(10),6,8-pentaene*

Dissolve 1.0 g. of equilenin 17-ethylene ketal in 15 ml. of dry pyridine, and add 5 ml. of acetic anhydride. Allow the solution to stand at room temperature for 20 hours, at which time remove the solvents under vacuum to obtain the crude product. Recrystallize from acetone and petroleum ether.

EXAMPLE 12

*3-benzoyloxy-17,17-ethylenedioxyestra-1,3,5(10),6,8-pentaene*

Dissolve 100 mg. of equilenin 17-ethylene ketal in 5 ml. of dry pyridine, and add 2 ml. of benzoyl chloride. Remove the solvents under vacuum after letting stand for 18 hours. Dissolve the gummy residue in ether and wash the solution with water, sodium bicarbonate solution and water. Evaporate the solvent and dissolve the residue in acetone; then precipitate with petroleum ether.

EXAMPLE 13

*17,17-ethylenedioxyestra-1,3,5(10),6,8-pentaen-3-ol*

Stir and distill a mixture of 100 mg. of equilenin, 100 mg. of p-toluenesulfonic acid monohydrate, and 160 ml. of ethylene glycol over a period of 1 hour at 6 mm. pressure with a still head temperature of 83°. After this period, add an additional 100 ml. of ethylene glycol and continue the distillation at 6 mm. pressure for one more hour. A volume of 230 ml. of distillate is to be collected over the two hour period. Cool the reaction mixture and adjust to a pH of 8.5 with an aqueous sodium bicarbonate solution. Extract the product with ether. Dry the organic layer over anhydrous magnesium sulfate and evaporate in vacuo. Recrystallize from acetonitrile to yield 17,17-ethylenedioxyestra-1,3,5(10),6,8-pentaene-3-ol.

EXAMPLE 14

*17,17-ethylenethioxy-3-methoxy-1,3,5(10),6,8-pentaene*

Reflux for 6 hours a solution of 1 g. of equilenin methyl ether and 60 mg. of p-toluenesulfonic acid in 150 ml. of benzene containing 2 ml. of 2-mercaptoethanol, with continuous removal of water with a Dean-Stark apparatus. Cool the solution, wash with saturated sodium bicarbonate solution once, then with water. Evaporate the dried solvent solution under vacuum, and recrystallize the recovered crystalline product with methanol, thus to afford 17,17 - ethylenethioxy - 3 - methoxyestra - 1,3,5(10),6,8-pentaene.

EXAMPLE 15

*17,17-ethylenedithio-3-methoxyestra-1,3,5(10),6,8-pentaene*

Cool a mixture of 10 g. of equilenin methyl ether, 50 ml of ethanedithiol, and 50 ml. of chloroform to 5°, then bubble hydrogen chloride through the solution for 3 hours. Remove the solvents under vacuum, and dissolve the solids thus obtained in hot acetone, concentrate slightly, and cool to deposit the product, 17,17-ethylenedithio-3-methoxyestra-1,3,5(10),6,8-pentaene.

EXAMPLE 16

*3-cyclopentyloxy-17,17-ethylenedioxyestra-1,3,5(10),6,8-pentaene*

Treat a solution of 1.0 g. of equilenin cyclopentyl ether in 100 ml. of benzene with 150 mg. of p-toluenesulfonic acid and 9 ml. of ethylene glycol. Reflux for 50 hours, removing water via a Dean-Stark tube. Wash the mixture with a saturated solution of sodium bicarbonate, then with water. Evaporate the benzene solution and crystallize the residue from methanol to obtain 3-cyclopentyloxy - 17,17 - ethylenedioxyestra - 1,3,5(10),6,8-pentaene.

EXAMPLE 17

*17,17-diethoxy-3-methoxyestra-1,3,5(10),6,8-pentaene*

Warm 1.0 g. of equilenin methyl ether in 20 ml. of ethanol (absolute), 5 ml. of ethyl orthoformate and 0.05 ml. of sulfuric acid at 60° so as to obtain a clear solution, and keep this at 50° for 4 hours. Add saturated aqueous sodium carbonate to the cooled mixture and isolate the product with ether.

We claim:
17,17-diethoxy-3-methoxyestra-1,3,5(10),6,8-pentaene.

References Cited by the Examiner
UNITED STATES PATENTS
2,378,918    6/45    Fernholz _____ 260—397.3

OTHER REFERENCES
Fieser et al.: Steroids, p. 460, Reinhold Pub. Co.
Hern et al.: Helvetica Chem. Acta 31, pp. 1289–1295.
Loewenthal: Tetrahedron 6, No. 4, pp. 269–303, June 1959.

LEWIS GOTTS, *Primary Examiner.*